July 19, 1938.  F. G. THWAITS  2,124,441
VEHICULAR TANK STRUCTURE
Filed Feb. 4, 1935  2 Sheets-Sheet 1
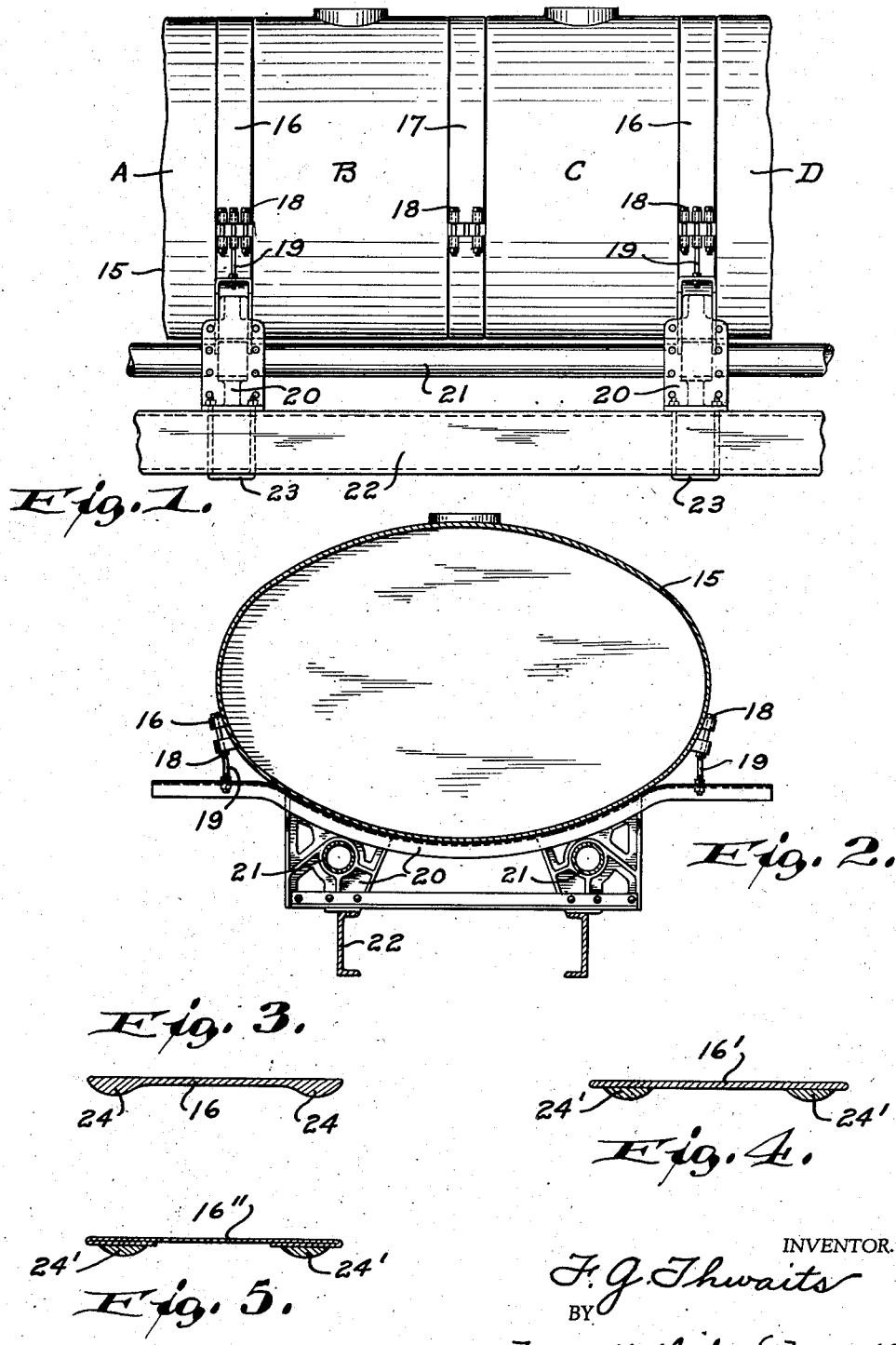

July 19, 1938.                F. G. THWAITS                2,124,441
                          VEHICULAR TANK STRUCTURE
                           Filed Feb. 4, 1935         2 Sheets-Sheet 2
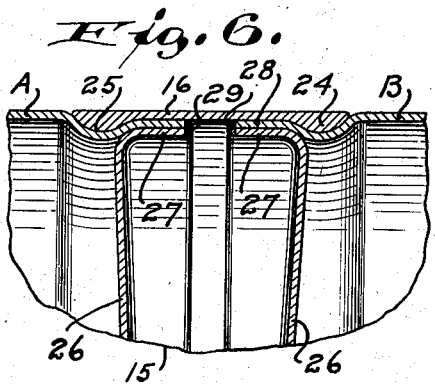
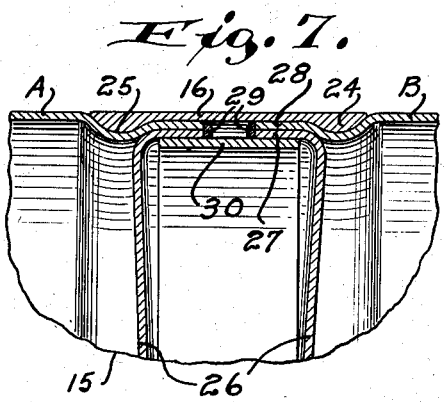
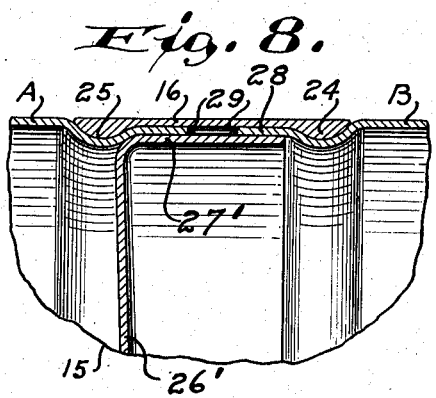
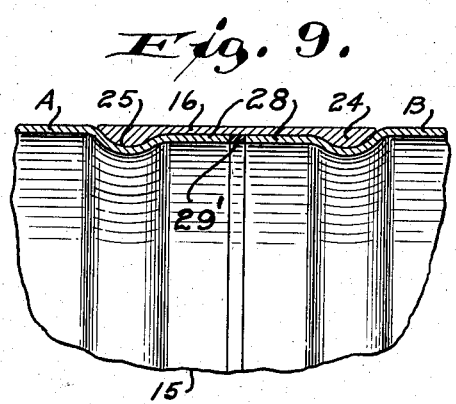
INVENTOR.
F. G. Thwaits
BY
Morsell, Lieber & Morsell
ATTORNEYS.

Patented July 19, 1938

2,124,441

UNITED STATES PATENT OFFICE 2,124,441

VEHICULAR TANK STRUCTURE

Frederick G. Thwaits, Wauwatosa, Wis., assignor to The Heil Co., Milwaukee, Wis., a corporation of Wisconsin Application February 4, 1935, Serial No. 4,851

4 Claims. (Cl. 220—80)

The present invention relates generally to improvements in the art of manufacturing tank structures, and more especially tank assemblages fitted for vehicular conveyance or transportation as by motor trucks, railway cars, or the like.

Generally defined, an object of the invention is to provide an improved tank structure which is simple, compact, and durable in construction.

It has heretofore been common commercial practice to utilize two or more straps or bands engageable with horizontally spaced portions of an elongated tank assemblage, for the purpose of fastening the tank structure to the chassis of a vehicle or other support. In cases where the tank assemblage was composed of several end-united individual tanks or shells forming segregated successive storage compartments, these retaining straps were sometimes additionally utilized to unite the adjacent tank sections; but in every known instance, the connecting and fastening bands were permitted to project either partially or wholly beyond the external contour of the tank assembly. With the present pronounced trend toward the streamlining of vehicular tank trucks, this projection or outward extension of the fastening bands is decidedly objectionable, both because of the wind resistance introduced by the projections, and because of the mitigation in the streamline appearance caused by the outwardly projecting elements.

It is therefore an object of the present invention to provide an improved tank assemblage wherein the external tank and strap surfaces are disposed flush with each other, so as to eliminate outwardly extending ledges or projections tending to destroy streamline effects and appearances.

Another specific object of the invention is to provide an improved strap structure for more rigidly interconnecting and uniting the adjacent flanged ends of the sections of a tank, than has heretofore been possible.

Still another specific object of the invention is to provide an improved reenforced tank structure which is more effectively braced against possible distortion, especially at the points of attachment of the tank to a support.

A clear conception of embodiments of the several features constituting the present improvement, and of the mode of constructing and of mounting vehicular tank structures built in accordance with the present invention, may be had by referring to the drawings accompanying and forming a part of this specification, in which like reference characters designate the same or similar parts in the various views.

Fig. 1 is a fragmentary side elevation of a tank structure, showing the same mounted upon and attached to the chassis of a vehicle;

Fig. 2 is a transverse vertical section through the tank and tank mounting of Fig. 1;

Fig. 3 is an enlarged section taken transversely through one form of strap stock;

Fig. 4 is a similarly enlarged similar section through another form of strap stock;

Fig. 5 is a likewise enlarged similar section through still another form of strap stock;

Fig. 6 is a fragmentary enlarged section through an embodiment of the improvement as a releasable connector between independent tank units;

Fig. 7 is a similar view of a modification of Fig. 6;

Fig. 8 is a similar illustration of an embodiment wherein successive shells of a tank structure are interconnected both by a common partition and by one of the improved straps; and Fig. 9 is a similar showing of an embodiment in which the successive shell sections of a tank are directly welded together and interconnected by an improved strap.

While the invention has been shown and described herein as being specifically applied to tank structures especially applicable to motor-propelled vehicles, it is not the intent to limit the scope by such specific disclosure since some of the novel features are obviously more generally applicable to other types of tank assemblages.

Referring to Figs. 1 and 2 of the drawings, tank 15 may comprise either a single elliptical elongated shell, or several successive shell sections A, B, C, D, and is embraced by a series of connecting and retainer straps 16, 17, the outer surfaces of which are disposed flush with the external bounding surface of the tank 15 so as to eliminate outward projections at the major portions of these straps. The ends of each strap 16, 17 are interconnected by clamping bolts 18, and the straps 16 are additionally engaged by longer bolts 19 which serve to fasten the tank 15 to saddles 20 upon which the tank rests. The successive saddles 20 are spaced apart but interconnected by tubular beams 21 extending longitudinally beneath the tank structure, and the saddles 20 may be detachably connected to the chassis 22 of a vehicle by means of U-shaped fasteners 23. Upon release of these fasteners 23, the entire tank assemblage, including the tank 15, straps 16, 17, saddles 20, and beams 21, may be removed and handled as a unit; and in the final assemblage, the bolts 18, 19 are normally concealed by running boards and housings disposed on the opposite sides of the tank.

The improved fastening straps 16, 17 may be formed of similar strip material, the structure of which may be varied, and may be of the types shown in Figs. 3, 4, or 5. In Fig. 3 is shown the cross-section of a preferred type of strap stock formed by the extrusion as by rolling, swaging, or drawing, of a single ribbon of metal, so as to provide substantially semi-cylindrical enlargements 24 along the opposite edges of the strap 16. In Fig. 4 is disclosed the cross-section of another type of strap stock formed by soldering or welding semi-cylindrical strips 24' to the opposite edge portions of a flat ribbon 16'. In Fig. 5 is illustrated the cross-section of still another type of strap stock likewise formed by soldering, welding, or otherwise attaching semi-cylindrical strips 24' to the opposite overlapped edge portions of a relatively thin, flat ribbon 16''. The strap formation may obviously be varied considerably, but the end enlargements 24, 24' are important.

Several specific applications of the improved connecting and retainer straps 16 or 17, to tank structures of various types, are illustrated in Figs. 6 to 9, inclusive. While the type of strap 16 shown in Fig. 3 has been utilized in all of the embodiments of the invention shown in Figs. 6 to 9, inclusive, it should be understood that straps of other types such as shown in Figs. 4 and 5, for instance, may be used in the specific embodiments. In each of these specific embodiments the tank shell, which in each case is formed of several sections, is provided with spaced, parallel recesses or grooves 25 adapted for snug coaction with the semi-cylindrical enlargements 24 of the retainer strap 16, and the portions of the tank shell located between each set of grooves 25 are of reduced diameter and coact with the internal surface of the strap 16 between the enlargements 24 thereof. This construction and coaction of the tank and straps causes the external surfaces of these elements to be flush with each other, and by utilizing a filler at the exposed crevices and subsequently coating the external surfaces with paint or enamel, detection of the location of the straps 16 is made practically impossible and the tank structure has a perfectly smooth external appearance.

Referring specifically to Fig. 6, the tank 15 shown therein comprises independent shell sections A, B having adjacent flanged ends sealed by end heads 26. Each of these end heads 26 has a laterally projecting flange 27 disposed within the reduced end flange 28 of the corresponding shell section A, B and secured thereto by a continuous weld 29. The heads 26 seat against the internal beads formed by the grooves 25, and the coacting head and shell flanges 27, 28 are preferably of considerable length so that relative expansion and contraction of the shells and end heads will not undesirably stress the welds 29. With this type of assemblage, the successive tank sections or units are firmly and positively interconnected when the straps 16 are clamped in place, but when these straps are released, the tank units become disconnected and are removable from each other.

Referring to Fig. 7, the tank 15 illustrated therein comprises two alined sections A, B having adjacent ends sealed by end heads 26 each having a laterally extending flange 27 disposed within and secured to the reduced shell end flange 28 by means of a weld 29. In this embodiment, the tank units are permanently interconnected by an inner band 30 which coacts with the interiors of the adjacent end head flanges 27 and is rigidly attached thereto and to the shell end flanges 28, by means of the welds 29. When the strap 16 is applied, the enlargements 24 thereof coact with the recesses 25, thereby preventing lateral displacement of the strap; and the intervening flat portion of the strap covers the shell flanges 28 and welds 29, thereby concealing and protecting the latter. The tank units of this assemblage are not, however, separable upon removal of the strap 16, as in the case of Fig. 6, unless the band 30 is removed.

Referring to Fig. 8, the tank 15 disclosed therein likewise comprises two alined shell sections A, B having adjacent end flanges 28 of reduced diameter. A single partition or head 26' is provided with an integral, laterally extending, long flange 27' which is snugly confined within both of the shell end flanges 28 and is permanently attached thereto by two welds 29. When the strap 16 of this embodiment is in place, the enlargements 24 again coact with the shell recesses 25; and the intervening flat strap portion coacts with the shell end flanges 28 and conceals the welds 29. As in the case of Fig. 7, the tank sections A, B of this modification are not separable upon removal of the strap 16, but the enlargements 24 of the strap again serve to prevent lateral shifting of the strap.

Referring to Fig. 9, the tank 15' of this embodiment is devoid of partitions but is formed of end-united shell sections A, B having adjacent end flanges 28 which are rigidly and permanently interconnected by a single continuous weld 29'. When the strap 16 is applied to this single compartment tank 15, the strap enlargements 24 coact with the shell recesses 25 to positively prevent lateral shifting of the strap, and the intervening flat portion of the strap coacts with the shell end flanges 28 and with the weld 29' so as to conceal and protect the same.

From the foregoing description, it will be apparent that the present invention provides an improved clamping and retaining strap structure for interconnecting the adjacent flanged ends of several tank units and for concealing the joint between such units, without producing undesirable projections extending beyond the external bounding surface of the tank. In the assemblage illustrated in Fig. 6, the connecting strap, besides serving as means for attaching the tank assembly to a support, also detachably interconnects the several successive flanged tank sections. In each instance, the reduction in diameter of the tank shells at the end flanges 28 thereof materially strengthens the tank structure due to the compression of the material resulting from the reduction in diameter during flanging of the shell. The beads formed during the production of the recesses 25, also reenforce the tank shell, and the assemblage is especially adapted for use in vehicular tanks having streamlined appearance. The special connecting straps may be readily formed so as to snugly engage the recesses 25 and the tank end flanges 28. The invention has proven highly satisfactory in actual commercial production and use and provides a tank joint structure which is extremely durable and compact.

It should be understood that it is not desired to limit the invention to the exact details of construction herein shown and described, for various modifications within the scope of the claims may occur to persons skilled in the art.

It is claimed and desired to secure by Letters Patent:

1. A multiple section tank comprising, a shell structure consisting of alined independent longitudinally straight shells having adjacent ends of reduced external diameter and each having an external recess between its reduced end and the main body thereof, said recesses and reduced ends providing a common groove extending about the axis of the shells and the bottoms of said recesses being of lesser external diameter than said reduced shell ends, and a single strap having thickened edge portions formed integral with a relatively thin medial portion and completely filling said groove to provide a flush and continuously smooth external surface for said shell structure extending across said groove.

2. A multiple section tank comprising, a shell structure consisting of alined independent longitudinally straight shells having adjacent ends of reduced external diameter and each having an external recess between its reduced end and the main body thereof, said recesses and reduced ends providing a common groove extending about the axis of the shells and the bottoms of said recesses being of lesser external diameter than said reduced shell ends, and a single strap having a thin medial portion and integral thickened edge portions completely filling said groove to provide a flush and continuously smooth external surface for said shell structure extending across said groove, said strap having a solid transverse cross-section substantially similar and equal to the corresponding cross-sectional area of said groove.

3. A multiple section tank comprising, a shell structure consisting of alined independent longitudinally straight shells having adjacent ends of reduced external diameter and each having an external recess between its reduced end and the main body thereof, said recesses and reduced ends providing a common groove extending about the axis of the shells and the bottoms of said recesses being of lesser external diameter than said reduced shell ends, and a single solid strap having thickened edge portions completely filling said recesses and an intervening portion formed integral with said edge portions and completely filling the remainder of said groove to provide a flush and continuously smooth external surface for said shell structure extending across said groove.

4. A multiple section tank comprising, axially alined independent longitudinally straight shells having adjacent ends of similarly reduced external diameter and each having an external recess of substantially semi-circular transverse cross-section between its reduced end and the main body thereof, said recesses extending parallel to each other and cooperating with said reduced ends to provide a common groove extending about the shell axis, and a single strap having a medial portion of uniform internal diameter equal to the external diameter of said shell ends and of external diameter equal to the external diameter of said shells beyond said recesses, said strap also having integral thickened edge portions of substantially semi-circular transverse cross-section completely filling said recesses and cooperating with said medial portion to provide a continuously smooth external surface for the tank flush with the external surface of the main bodies of said shells and extending entirely across said groove.

FREDERICK G. THWAITS.